United States Patent
Eckardt

(10) Patent No.: US 6,713,014 B2
(45) Date of Patent: *Mar. 30, 2004

(54) METHOD AND APPARATUS FOR INJECTION MOLDING PARTS WHICH HAVE AT LEAST ONE CAVITY

(75) Inventor: Helmut Eckardt, Meinerzhagen (DE)

(73) Assignee: Battenfeld GmbH, Meinerzhagen (DE)

( * ) Notice: Subject to any disclaimer, the term of this patent is extended or adjusted under 35 U.S.C. 154(b) by 440 days.

This patent is subject to a terminal disclaimer.

(21) Appl. No.: 09/790,212

(22) Filed: Feb. 21, 2001

(65) Prior Publication Data

US 2001/0017433 A1 Aug. 30, 2001

(30) Foreign Application Priority Data

Feb. 22, 2000 (DE) ......................................... 100 07 994

(51) Int. Cl.⁷ .............................................. B29D 22/00
(52) U.S. Cl. ..................... 264/570; 264/572; 425/130
(58) Field of Search ................. 264/570, 572; 425/130

(56) References Cited

U.S. PATENT DOCUMENTS

| | | | |
|---|---|---|---|
| 4,101,617 A | 7/1978 | Friederich | 264/93 |
| 5,139,714 A | 8/1992 | Hettinga | |
| 5,198,240 A | 3/1993 | Baxi | |
| 5,505,891 A * | 4/1996 | Shah | 264/28 |
| 5,705,201 A | 1/1998 | Ibar | 425/130 |
| 5,759,479 A | 6/1998 | Gotterbauer | |
| 5,928,677 A | 7/1999 | Gosdin | 425/130 |
| 6,372,177 B1 | 4/2002 | Hildesson et al. | |
| 6,579,489 B1 | 6/2003 | Thomas | |

FOREIGN PATENT DOCUMENTS

| | | |
|---|---|---|
| DE | 24 61 580 | 7/1975 |
| DE | 2800482 | 7/1978 |
| DE | 27 16 817 A1 | 8/1978 |
| DE | 42 19 915 | 12/1993 |
| DE | 93 16 984 U1 | 1/1994 |
| DE | 4240017 | 6/1994 |
| DE | 19518964 | 11/1996 |
| DE | 196 13 134 A1 | 10/1997 |
| DE | 199 03 682 A1 | 8/2000 |
| EP | 0 467 201 A2 | 1/1992 |
| EP | 0 400 308 B1 | 6/1993 |
| GB | 2 322 094 | 8/1998 |
| JP | 5-261750 | 10/1993 |
| JP | 10-156856 | 6/1998 |
| JP | 2001-047472 | 2/2001 |

OTHER PUBLICATIONS

Vink, David, "Testing the water," *European Plastics News*, pp. 35–36 (Nov. 1999).

Michaeli, W., et al., "Gas geben mit Wasser. Wasserinjektionstechnik (WIT) : Eine Alternative zur Gasinjektionstechnik?" "Step on the gas with water injection. Water–assisted injection moulding (WAIM) : An alternative to gas injection?," *KU Kunststoffe*, 89(4) : 20–21 (1999).

Michaeli, W., et al., "Kühlzeit reduzieren mit der Wasser–Injektionstechnik," KU *Kunststoffe*, vol. 90, pp. 67–72 (2000).

Michaeli, W., et al., "Gas oder Wasser?", KU *Kunststoffe*, vol. 89, pp. 56–58 and 60, 62 (1999).

* cited by examiner

*Primary Examiner*—Suzanne E. McDowell
(74) *Attorney, Agent, or Firm*—Hamilton, Brook, Smith & Reynolds, P.C.

(57) ABSTRACT

The invention relates to a method and an apparatus for injection molding thermoplastic molded parts, having at least one cavity. The method comprises the following steps: a) injecting thermoplastic melt from an injection unit along a melt flow path into the cavity of an injection molding tool; b) injecting a fluid into the still liquid plastic material, so that the plastic material is pressed against the walls of the cavity; c) allowing the plastic material to cool until it forms the self-supporting molded part; and d) removing the molded part from the cavity of the injection molding tool.

36 Claims, 3 Drawing Sheets

METHOD AND APPARATUS FOR INJECTION MOLDING PARTS WHICH HAVE AT LEAST ONE CAVITY

RELATED APPLICATION

This application claims priority to German Application 100 07 994.6, filed Feb. 22, 2000, the teachings of which are incorporated herein by reference.

BACKGROUND OF THE INVENTION

Prior art injection methods have used internal gas pressure to produce molded thermoplastic parts. Such a method is known, for example, from U.S. Pat. No. 4,101,617, issued to Friederich on Jul. 18, 1978. A pressurized fluid is here introduced into the still melted plastic. The pressure generated in the interior of the melt presses the melt against the cavity wall of the injection molding tool; sink marks due to volume contraction during cooling are thus avoided.

SUMMARY OF THE INVENTION

Nitrogen usually is used as the pressurized fluid which is injected into the melt. It has the advantage that it is an inert gas and thus does not react chemically with the hot melt. However, this entails the disadvantage that nitrogen generally is quite expensive to produce. Either the injection molding apparatus has to be supplied with nitrogen from bottles or else the gas has to be obtained on-site by means of molecular filters, if larger quantities are needed.

The economic requirements for the process are becoming more and more stringent, calling for ever shorter injection molding cycles together with the greatest possible improvement in the quality of the resulting molded parts. Various proposals have been made to achieve shorter cycle times:

European Patent EP 0 400 308, issued on Jun. 23, 1993, proposes that after the gas has been injected into the melt, it is again allowed to exit at a point removed from the injection point; then the gas is caused to circulate through the resulting cavity. A cooler is integrated into the gas circulation. This should cool the melt faster, since cooled gas is introduced in a closed circulation.

On the other hand, the German Patent DE 42 19 915, issued on Dec. 23, 1992, is based on the idea of injecting cooled gas into the melt. It specifically specifies that the gas be cooled to temperatures down to −160° C. In this way, the plastic material is supposed to cool as fast as possible; the time interval between injecting the melt into the mold until the product is removed from the mold is thus reduced.

The previously known methods have the disadvantage that, on the one hand, expensive nitrogen is used now as before and, on the other hand, despite all these measures, the cooling effect of the gas is limited due to its limited heat capacity. Independently of this, but due to the great viscosity difference between the melt and the gas, the problem arises that sometimes flow marks appear on the surface of the molded part, so as to impair the quality of the finished part.

It is therefore desirable to further develop the injection molding method of the generic type, in such a way that the above disadvantages are minimized or avoided. The method and the associated apparatus should make it possible to avoid using expensive nitrogen. Furthermore, it should accomplish the shortest possible cooling time, which significantly shortens the injection molding process. Finally, the method also should assure that the melt flows into the injection molding tool as homogeneously as possible, so that change-over marks are avoided as much as possible.

In terms of method, the invention in one embodiment includes a method for injection molding thermoplastic molded parts, having at least one cavity. The method includes: a) injecting thermoplastic melt from an injection unit along a melt flow path into a cavity of an injection molding tool; b) injecting a fluid into the still liquid plastic material, so that the plastic material is pressed against walls of the cavity; c) allowing the plastic material to cool until it forms a self-supporting molded part; and d) removing the molded part from the cavity of the injection molding tool. The cavity is filled with plastic melt, according to step a), in such a way that the cavity is not filled completely with plastic melt; and the fluid, which is injected into the still liquid plastic material in accordance with step b) is a liquid with a high heat capacity wherein the surface of the cavity is not covered completely until the fluid is injected into the melted plastic material.

The central idea of the invention therefore is to inject into the melt a fluid with a high heat capacity. In combination with filling the cavity partially, plastic material first of all is used more efficiently. Filling the cavity partially with melt in combination with using a fluid with a high heat capacity achieves the result of speeding up the cooling process, so that the cycle time of the injection molding cycle can be significantly reduced. Surprisingly, it has here appeared that, due to the cited characteristics, hardly any flow marks appear, which otherwise must be feared and are observed with the internal gas pressure method. This is due to the fact that the viscosity of the liquid melt is comparable to that of the injected fluid with a high heat capacity.

According to a first development, it is specified that, while the process step b) of is executed, a portion of the still melted plastic material is displaced from the cavity into a demoldable secondary cavity. The flow of plastic material from the cavity into the secondary cavity is controlled by valve means, which are opened and closed according to a prescribed timing This very specifically influences the overflow of melt from the main cavity to the secondary cavity.

The fluid can be injected along the melt flow path, through a sprue region, into the cavity, or alternatively directly into the cavity by means of an injection nozzle.

In the second case, it can be advantageous that, while step b) is being executed, the injected fluid drives back a portion of the plastic material situated in the cavity toward the injection unit and out of the cavity.

The flow behavior of the melt and the control of its behavior are further improved if, before the thermoplastic is injected according to step a) a pressure greater than the ambient pressure is built up in the cavity by introducing a gas. This gas pressure can be dissipated only gradually during the above step b). The dissipation of the gas pressure can be controlled or regulated depending on how the injection pressure of the liquid increases during the injection process.

As a process variant, it can also be proposed that, after the fluid has been injected and before or while the plastic is allowed to cool, more pressurized gas is introduced into the cavity formed by the fluid.

An advantageous design has proven to be such that the fluid is temperature-controlled before it is injected into the still melted plastic material. The idea here is that the fluid is cooled to a prescribed temperature range. An especially advantageous temperature range is between about 0° C. and about 20° C., preferably between about 4° C. and about 15° C. But it may also be necessary, especially in the case of materials which are damaged by shock-like cooling, to heat the fluid to a prescribed temperature range. Especially advantageous temperature ranges here are between about 20° C. and about 150° C., preferably between about 40° C. and about 100° C.

The inventive concept ascribes special importance to the removal of the injected fluid—if possible still in the injection molding apparatus. According to the invention, there are several possibilities here.

The first possibility is that, after the material has been allowed to cool and before it is removed from the mold, the following process step is performed: c') introducing compressed gas, preferably compressed air, along the path over which the fluid was injected into the plastic material, and blowing out the fluid from the cavity of the molded part at least at one blowout point, which is situated at a point which is remote from the point where the fluid is introduced.

The blowout point preferably is disposed toward the end of the flow path of the plastic material.

Alternatively, the arrangement can be such that, at the moment in question, the following process step is performed: c") introducing compressed gas, preferably compressed air, at a gas input point, which is remote from the point at which the fluid was injected into the plastic material, and blowing out the fluid from the cavity of the molded part through the point at which the fluid was introduced into the plastic material.

Besides blowing out the fluid from the cavity, suctioning out the fluid is also possible. This process is such that the following process step is performed: c'") applying a vacuum to the point which has a fluidic connection with the fluid-filled cavity, so as to suction the fluid situated in the cavity out therefrom.

It is here of advantage to apply the vacuum to the injection nozzle for the fluid.

Appropriately controlling or regulating the media pressures can beneficially affect the molding process while the melt and the fluid are being injected and also while the material is solidifying. It is therefore advantageously specified that, during steps b) and/or c) pressure is exerted on the fluid that has been introduced into the plastic melt, this pressure being regulated or controlled in accordance with a specified time profile. The pressure profile can here be controlled or regulated according to a pulsating rising and falling pattern; such as a sinusoidal pressure pattern, coursing about a given constant pressure. Alternatively, it can also be specified that the pressure is regulated or controlled during a first time phase at a first, preferably constant level and, during a later, second time phase, at a second, preferably constant level, such that the first pressure level is lower than the second one. Water or oil can be used as fluids with a high heat capacity.

The injection molding apparatus to perform the inventive method comprises an injection unit, an injection molding tool with a cavity, which has a melt flow path, over which the melted plastic material can be introduced into the cavity, and means for injecting a fluid.

The inventive apparatus includes means for removing, especially suctioning out, the fluid situated in the cavity of the molded part, the fluid being a liquid with a high heat capacity.

Preferably, the means includes a nozzle through which the fluid can be blown out from the cavity. Alternatively, the means is an apparatus for creating a vacuum, which can be connected to the means for injecting the liquid.

Technical advantages are obtained if the apparatus contains an injection element by means of which fluid or gas can optionally be introduced into the cavity of the injection molding tool. The injection element therefore can be switched from one medium to another.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
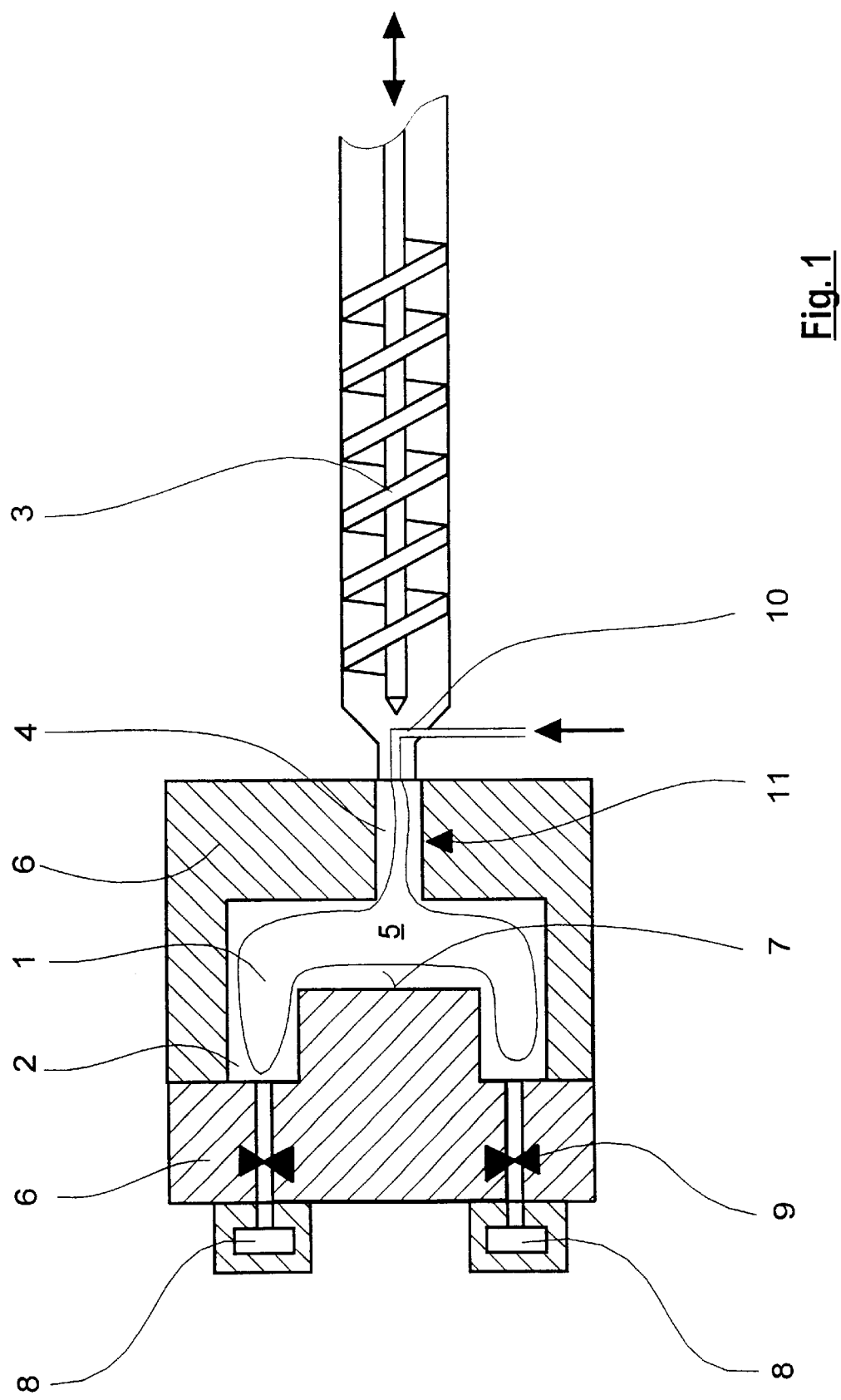
FIG. 1 shows a schematic section through an injection molding apparatus.

FIG. 1 shows an injection molding apparatus comprising an injection unit 3, which produces plastic melt in the usual manner and injects it into an injection molding tool 6. The mold 6 has a cavity 5 with a cavity wall 7. The plastic melt is here injected along a melt flow path 4, from the injection unit 3, into the mold 6.

The molded part 2 that is being produced has a cavity 1. On the one hand, this makes the part lighter and requires less material and, on the other hand, it makes it possible for the melt to be pressed against the cavity wall 7 while the melt is cooling in the cavity 5. The molded parts 2 produced in this manner consequently have an especially good surface quality.

The arrangement can be such that, while the melt is being injected into the cavity 5 and/or while the fluid is being introduced, part of the melt flows over into an overflow cavity 8. The overflow can be controlled or regulated by valve means 9.

In the present case, the fluid is injected through the injection nozzle 10. As can be seen, the fluid consequently spreads out along the melt flow path 4 in the direction of the cavity 5.

As the fluid, the invention specifies a liquid with a high heat capacity. This results in a very short cycle time, since the liquid can take up a great deal of heat from the plastic melt. The plastic melt consequently solidifies quickly, so that the process of removing the object from the mold can start earlier, compared to the known method.

Generally, the heat capacity of a material is the amount of heat transferred to raise a unit mass of a material 1 degree in temperature. The ratio of the amount of heat transferred to raise a unit mass of material 1 degree to that required to raise a unit mass of water 1 degree at some specified temperature is the specific heat of the material. For most engineering purposes, heat capacities may be assumed numerically equally to specific heats. Thus, the specific heat of water, which can be used as the fluid in one embodiment, can have a range from about 1.007 Btu/(lb ° F.) to about 1.029 Btu/(lb ° F.). The specific heat of an oil, which can be used as the fluid in another embodiment, can have a range from about 0.31 Btu/(lb ° F.) to 0.60 Btu/(lb ° F.).

Before the fluid is injected, the cavity 5 is first partially filled. It has proven beneficial to fill it no more than up to about 80% of its capacity. Then the fluid, preferably water, is injected. By controlling the temperature of the fluid, specifically by cooling it to a temperature between about 4° C. and about 15° C., the plastic melt can be caused to solidify very quickly. It is sufficient to cool the plastic material to the point where it is self-supporting.

Figure 3:
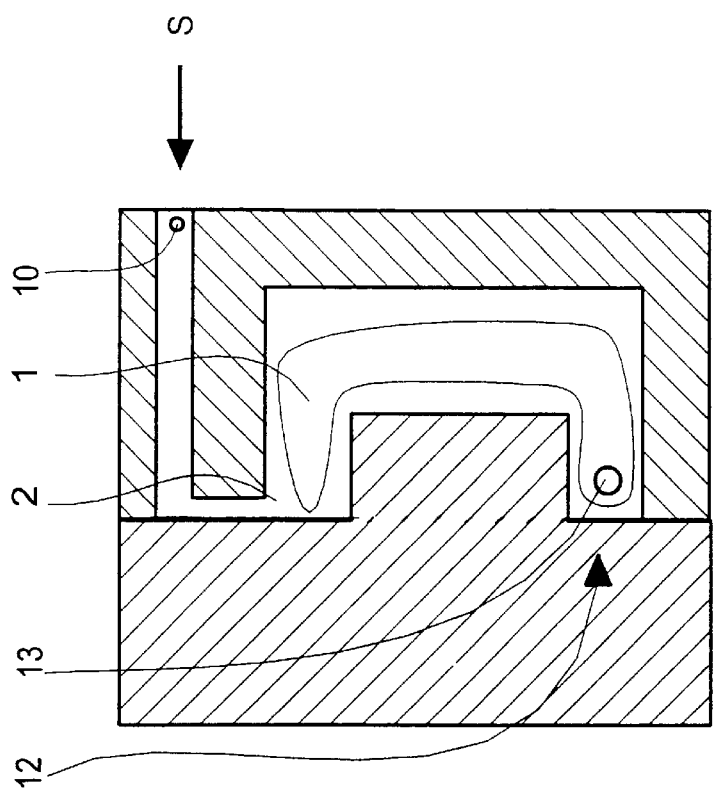
FIG. 3 shows the same section as in FIG. 2 but without the secondary cavity.
Figure 2:
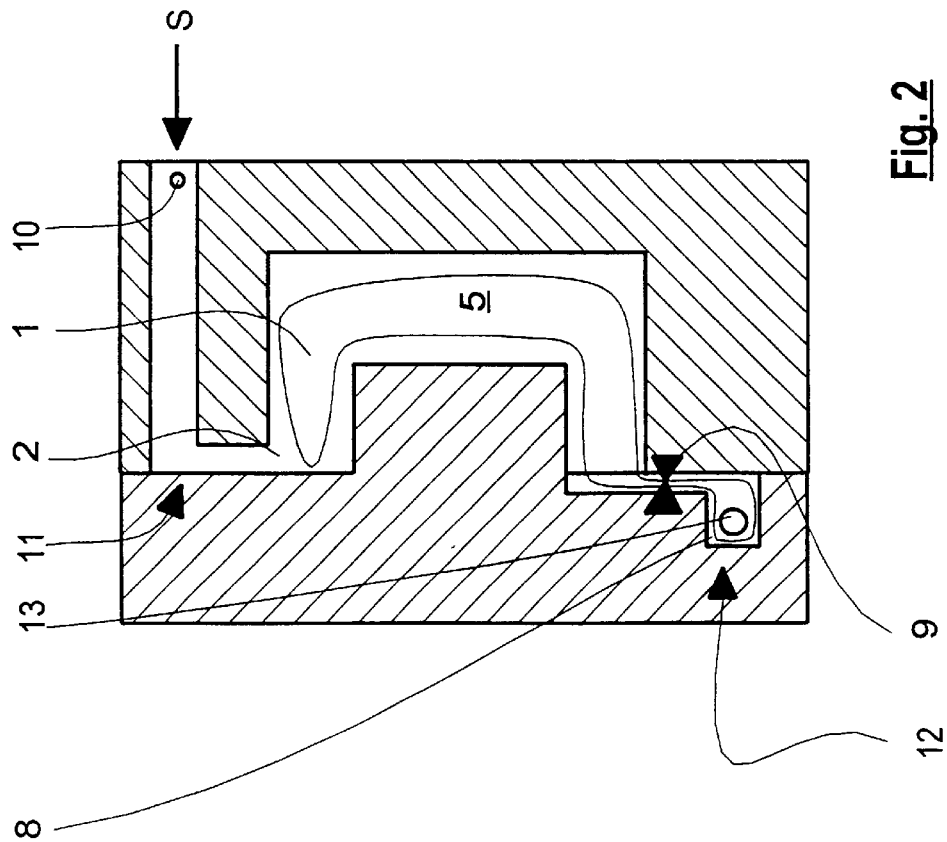
FIG. 2 shows a schematic section through an injection molding tool with a secondary cavity.

FIG. 1 shows that the fluid is introduced along the melt flow path 4 in the region of the sprue 11. FIGS. 2 and 3 show the detailed structure of the region of the injection molding tool.

As FIG. 2 shows, the melt S is injected into the cavity 5 in the region of the sprue 11. As already mentioned above, at the end of the flow path the melt flows from the main cavity 5 into the secondary cavity 8, the overflow being regulated by valve means 9. After at least partial solidification, the fluid filling the cavity 1 must again be removed therefrom. For this purpose, compressed air is introduced into the injection nozzle 10 for the fluid.

As FIG. 2 shows, the cavity 1 extends beyond the cavity 5, into the secondary cavity, which was accomplished by introducing fluid into the melt. A blowout nozzle 13 is situated in the region of the overflow cavity 8, namely at the blowout point 12 for the fluid. By injecting compressed air through the nozzle 10, all the liquid can again be blown out of the cavity 1. It is expelled through the blowout nozzle 13. As a supporting measure, a vacuum can be applied to the blowout nozzle 13.

The fluid can be blown out in similar fashion even if the process involves no overflow, as illustrated in FIG. 3.

Figure 4:
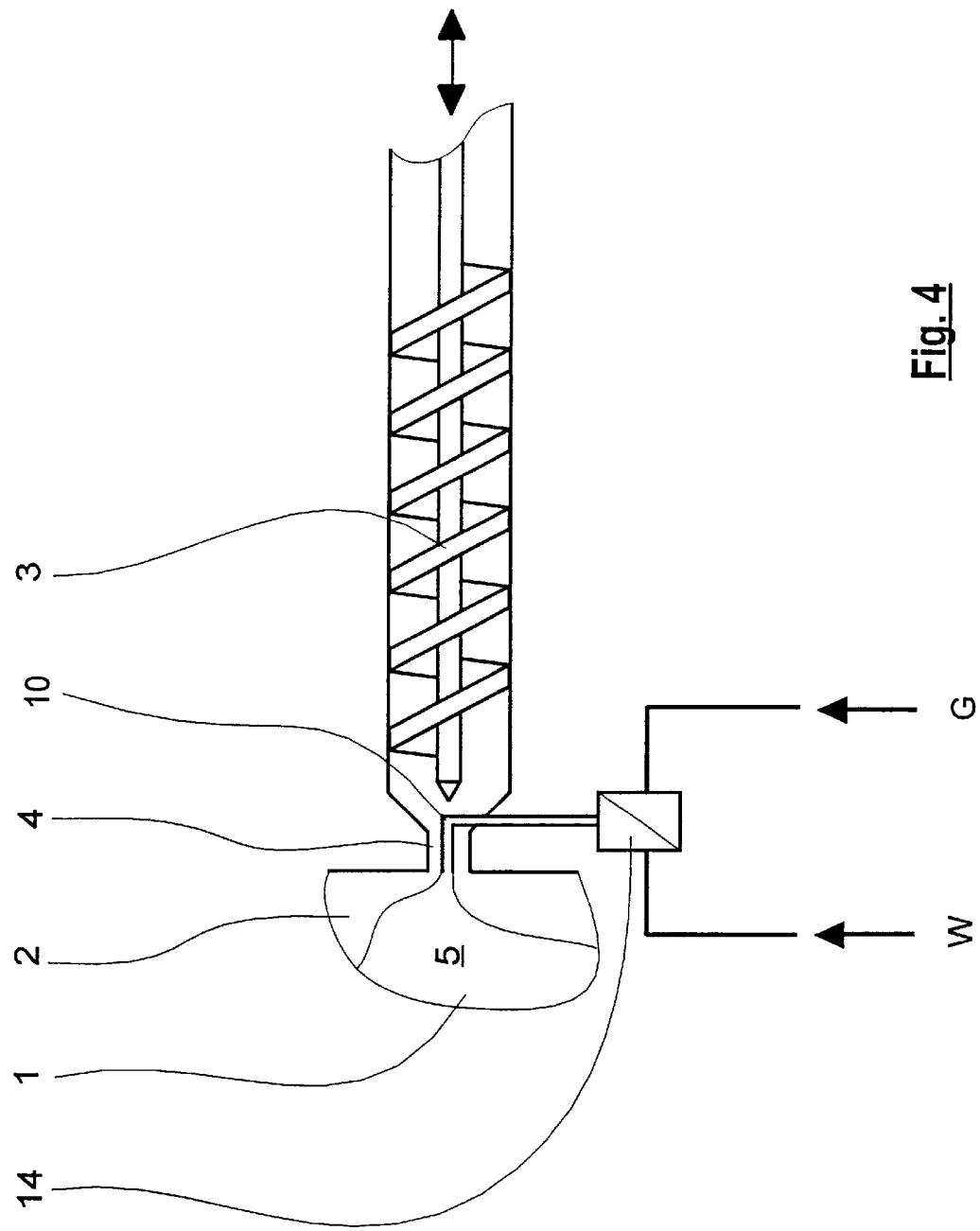
FIG. 4 shows a cutout through the injection region for melt and liquid.

FIG. 4 shows a design of an apparatus, using an injection element 14 through which liquid (water) W or compressed air (gas) G can optionally be injected. In FIG. 4, the injection nozzle 10 for liquid and gas does indeed extend into the region of the melt flow path 4, from the injection unit 3, into the mold cavity. However, it is equally possible to arrange the combined injection element 14 for liquid and gas in such a manner that it injects liquid or gas through the corresponding nozzle directly into the mold cavity.

The method described above can beneficially also be used for other customary injection molding methods. For example, it can also be readily used if the molded part is produced from more than one plastic component (2-K process).

Furthermore, it is possible, for example, to inject the fluid into the mold at two points, so as to create two media bubbles, and have them melt together by controlling the pressure appropriately.

The fluid can also be introduced in the sprue distributor, so as to supply several component cavities with fluid.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for injection molding thermoplastic molded parts, having at least one cavity, comprising:
    a) injecting thermoplastic melt from an injection unit along a melt flow path into a cavity of an injection molding tool;
    b) injecting a fluid into the still liquid plastic material, so that the plastic material is pressed against walls of the cavity;
    c) allowing the plastic material to cool until it forms a self-supporting molded part; and
    d) removing the molded part from the cavity of the injection molding tool;

the cavity being filled with plastic melt, according to step a), in such a way that the cavity is not filled completely with plastic melt; and the fluid, which is injected into the still liquid plastic material in accordance with step b) is a liquid with a high heat capacity, the surface of the cavity not being covered completely until the fluid is injected into the melted plastic material, and wherein, while the process step b) is executed, a portion of the still melted plastic material is displaced from the cavity into a demoldable secondary cavity.

2. The method of claim 1, wherein the flow of plastic material from the cavity into the secondary cavity is controlled by valve means, which are opened and closed according to a prescribed timing.

3. The method claim 1, wherein the fluid is injected along the melt flow path, through a sprue region, into the cavity.

4. The method of claim 1, wherein the fluid is injected directly into the cavity by means of an injection nozzle.

5. The method of claim 4, wherein, while step b) is being executed, the injected fluid drives back a portion of the plastic material situated in the cavity toward the injection unit and out of the cavity.

6. The method of claim 1, wherein, before the thermoplastic is injected according to step a) a pressure greater than the ambient pressure is built up in the cavity by introducing a gas.

7. The method of claim 6, wherein the gas pressure is gradually reduced during step b).

8. The method of claim 7, wherein the dissipation of the gas pressure is controlled or regulated depending on how the injection pressure of the fluid increases during step b).

9. The method of claim 1, wherein, after step b) and before step c) more compressed gas is introduced into the cavity formed by the fluid.

10. The method of claim 1, wherein the fluid is temperature-controlled after step a) but before it is injected into the still melted plastic material.

11. The method of claim 10, wherein the fluid is cooled to a specified temperature range.

12. The method of claim 11, wherein the specified temperature range lies between about 0° C. and about 20° C.

13. The method of claim 12, wherein the specified temperature range lies between about 4° C. and about 20° C.

14. The method of claim 11, wherein the specified temperature range lies between about 20° C. and about 150° C.

15. The method of claim 14, wherein the specified temperature range lies between about 40° C. and about 100° C.

16. The method of claim 1, wherein, after step c) and before step d) the following process step is performed:
    c') introducing compressed gas along the path over which the fluid was injected into the plastic material, and blowing out the fluid from the cavity of the molded part at least at one blowout point, which is situated at a point which is remote from the point where the fluid is introduced.

17. The method of claim 16, wherein the compressed gas includes compressed air.

18. The method of claim 16, wherein the blowout point is disposed in the region of the end of the flow path of the plastic material.

19. The method of claim 1, wherein, after step c) and before step d) the following process step is performed:

c") introducing compressed gas, at a gas input point, which is remote from the point at which the fluid was injected into the plastic material, and blowing out the fluid from the cavity of the molded part through the point at which the fluid was introduced into the plastic material.

20. The method of claim 19, wherein the compressed gas includes compressed air.

21. The method of claim 1, wherein, after step c) and before step d) the following process step is performed:

c''') applying a vacuum to the point which has a fluidic connection with the fluid-filled cavity, so as to suction the fluid situated in the cavity out therefrom.

22. The method of claim 21, wherein the vacuum is applied to the injection nozzle for the fluid.

23. The method of claim 1, wherein, pressure is exerted on the fluid that has been introduced into the plastic melt, this pressure being regulated or controlled in accordance with a specified time profile.

24. The method of claim 23, wherein the pressure is regulated or controlled according to a pulsating rising and falling pattern.

25. The method of claim 24, wherein the pressure pattern is sinusoidal and courses about a prescribed constant pressure.

26. The method of claim 25, wherein the pressure is regulated or controlled during a first time phase at a first level and, during a later, second time phase, at a second, level, such that the first pressure level is lower than the second one.

27. The method of claim 26, wherein the pressure is substantially constant during the first time phase and the second time phase.

28. The method of claim 1, wherein water is used as the fluid.

29. The method of claim 1, wherein oil is used as the fluid.

30. The method of claim 1, wherein the cavity is filled only up to about 80% of the cavity capacity with plastic melt according to step a).

31. A method for injection molding a part having at least one cavity therein, comprising:

injecting thermoplastic melt from an injection unit along a melt flow path into a cavity of an injection molding tool to partially fill the cavity;

injecting a fluid, which has a high heat capacity, into the thermoplastic melt to press the melt against walls of the cavity of the molding tool, the walls of the molding tool not being covered until the fluid is injected into the melted thermoplastic material, at least a portion of the thermoplastic material being displaced from the cavity into an overflow cavity;

allowing the thermoplastic material to cool until it forms a self-supporting molded part; and removing the part from the cavity of the injection molding tool.

32. An apparatus for injection molding thermoplastic molded parts containing at least one cavity, comprising:

an injection unit;

an injection molding tool having a cavity, which has a melt flow path, over which the melted plastic material can be introduced into the cavity;

an overflow cavity in fluid connection with the cavity;

means for injecting a liquid into the cavity, the liquid having a high heat capacity; and means for removing the liquid situated in the cavity of the molded part.

33. The apparatus of claim 32, wherein the means for removing includes means for suctioning out the liquid situated in the cavity of the molded part.

34. The apparatus of claim 32, wherein the means for removing includes a nozzle through which the liquid can be blown out from the cavity.

35. The apparatus of claim 32, wherein the means for removing includes an apparatus for creating a vacuum, which can be connected to the means for injecting the liquid.

36. The apparatus of claim 32, wherein the apparatus includes an injection element by means of which liquid or gas can optionally be introduced into the cavity of the injection molding tool.

* * * * *